March 24, 1942.    H. A. BRASSERT    2,277,067
MANUFACTURE OF METAL PRODUCTS
Filed Feb. 16, 1940
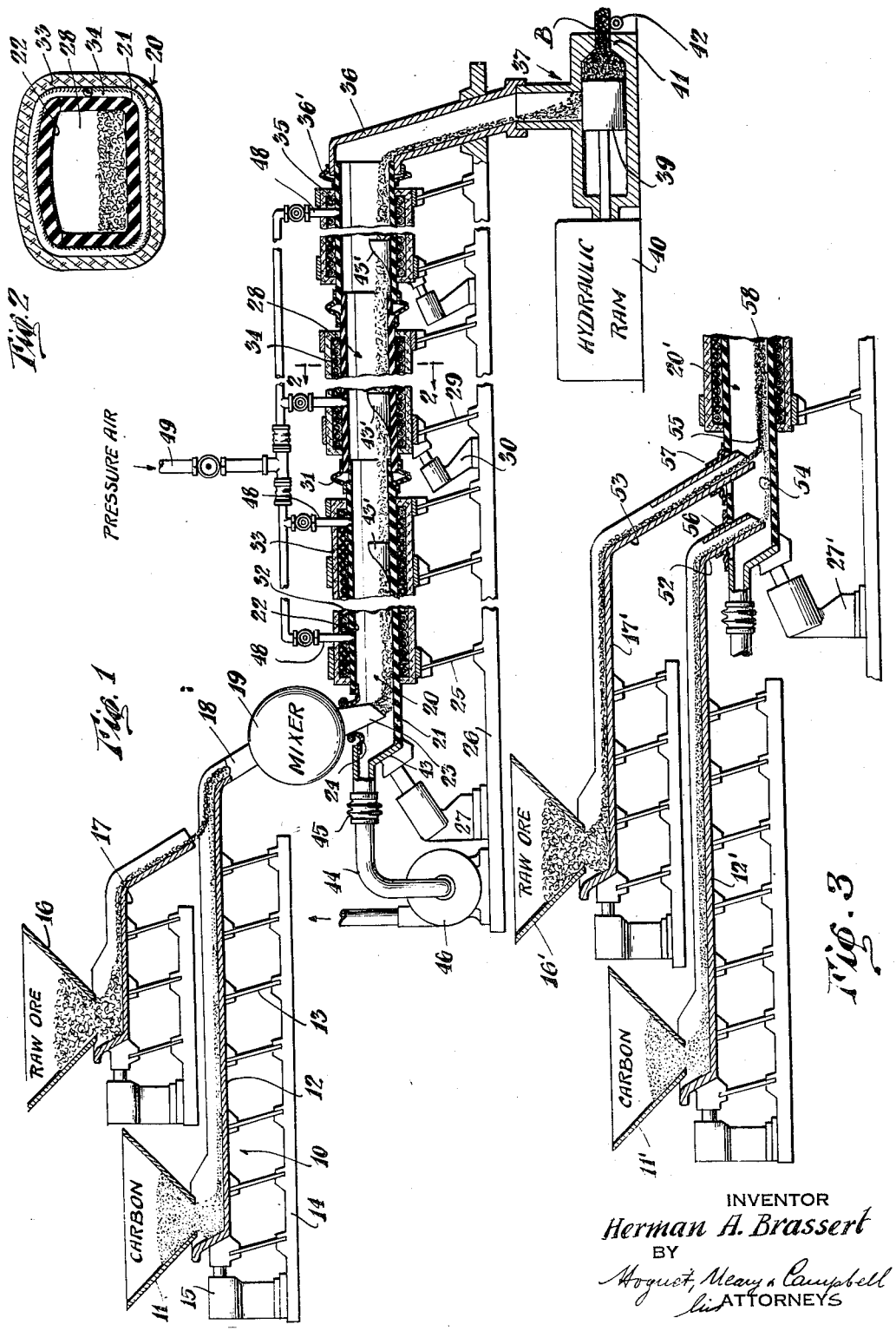
INVENTOR
Herman A. Brassert
BY
ATTORNEYS Patented Mar. 24, 1942

2,277,067

UNITED STATES PATENT OFFICE 2,277,067

MANUFACTURE OF METAL PRODUCTS

Herman A. Brassert, New York, N. Y., assignor to Minerals and Metals Corporation, New York, N. Y., a corporation of Delaware Application February 16, 1940, Serial No. 319,197

6 Claims. (Cl. 75—10)

This invention relates to the production of metallic bodies from iron and other metal ores or oxides, such as roll scale and has particular reference to a direct and continuous process for converting the ores into semi-finished or finished products, elongated and shaped by extrusion, rolling, forging or other working methods.

The production of iron directly from the ores without a melting step is well known and has been accomplished by many methods. All of these methods resulted in a low rate of production, either because of the slowness of the reduction process itself in cases where the ore and fuel were packed in mixed state while subjected to the proper temperature for a sufficient time to complete the reduction, which required many hours, as much as twenty-four hours or more according to prior methods; or because of the limited capacity of the equipment where the raw ore in finely-divided state was to be blown into a chamber with gaseous, or solid fuel, which equipment would have to be disproportionately large or multiplied in large numbers in order to produce a tonnage commensurate with the customary capacity of modern iron and steel plants; or because of the high pressures required to compact the finely-divided material in the cold state before sintering and for the final forming to accurate sizes and dimensions, which required ponderous and slow presses for the production or blooms of billets sufficiently large to feed modern mills.

It is the principal object of this invention to produce iron and steel directly from the ore without requiring a melting step and at rates commensurate with the normal capacities of existing rolling, forging or other shaping equipment for manufacturing semi-finished or finished iron and steel products.

Another object of the invention is to compact the material in all directions by extrusion while heated, so that an extruded bloom, billet or hollow or other semi-finished form is produced for further shaping.

Another object of the invention is to elongate the material either directly or after reheating by further extruding, rolling, forging, or any other means of shaping the material in its final or finished form.

These and other objects of the invention are attained by the steps of grinding the ore, such as iron ore or other iron oxide, such as roll scale or other metal oxides, to a very fine pulverulent state, preferably to one-hundred mesh or finer; substantially entirely removing the gangue therefrom by magnetic separation, flotation, jigging, or other methods of concentration; mixing the ore powder with a pure carbon, preferably carbon black, or pitch, or substantially ash-free coal or charcoal, pulverized to substantially the degree of fineness of the ore powder, or finer; adding to the ore-fuel mixture, fluxes or alloying metals, or other modifying agents as and if desired, these agents being likewise substantially as finely-divided or finer than the ore powder; and vibrating the fuel-ore powder mixture at high-frequency while heating the same to the temperature requisite to effect reduction of the ore powder without fusion by means of suitable fuels or electric resistance or preferably high frequency electric induction.

Under these conditions the reduction of the ore powder is rapid and complete, for the reason that the high frequency vibration of the particles greatly accelerates the reaction, due to the repeated rupture, by attrition or rubbing of the particles, of the reduced metal skin and of the gaseous envelope which surrounds each particle as the result of the reaction, thus permitting fresh reagents to attack the unreduced portions of the ore. Preferably this vibrating motion during reduction is imparted to the ore-fuel mixture as it is being conveyed in a continuous stream, as by a vibrating conveyor which is enclosed and also serves as the reaction and heating chamber. The migration of the heavier ore particles through lighter carbon particles when layers are vibrated may be utilized to mix the ore and carbon on the vibrating conveyor, thus dispensing with the preliminary mixing step.

The resulting reduced ore powder is discharged by the conveyor into a hopper leading to an extrusion press wherein the reduced metallic powder, while still retaining its heat, is extruded through a converging die so as to be compacted in all directions, whereby the bloom, billet, or hollow that issues from the press is dense and homogeneous and has substantially uniform tensile strength, both transversely and longitudinally. This bloom or billet or hollow is then further extruded, rolled, forged, drawn or otherwise shaped and deformed into the finished or semi-finished iron or steel product, with or without an intermediate reheating to the welding or rolling or other metal-working temperature or it can be finished cold, depending upon requirements.

It will be seen that by means of this invention pure metal products, having superior physical and chemical properties can be produced economically and efficiently directly from the ore without requiring an intermediate melting step, and because there is no melting step, the inclusion of undesirable elements is precluded, such as the excess of carbon resulting from blast furnace smelting operations, or sulphur, phosphorus, or other detrimental materials avidly absorbed from the coke by the metal when molten. Also, it is possible in the process and apparatus of this invention to introduce pure alloying metals or other modifying agents without the usual inclusion of undesirable accompanying materials or reactions. Furthermore, the grain structure of the finished or semi-finished materials may be closely regulated in the process and apparatus of this invention, since the initial pulverization is very fine and the temperature throughout may be accurately controlled to maintain or obtain the desired chemical or physical pattern, all without substantial loss of heat or materials.

For a more complete understanding of the invention, reference may be had to the accompanying drawing, in which:

Figure 1 is a diagrammatic representation of one form of apparatus for conducting the process of this invention;

Fig. 2 is a transverse section through the reducing chamber as seen along the line 2—2 of Fig. 1; and Fig. 3 is a diagrammatic representation of a modified form of apparatus for conducting the process of this invention.

An example of the material to be treated is preferably a rich iron ore, such as magnetite or hematite, although it may be a non-ferrous ore, or mixtures thereof, depending upon requirements. The ore, for example iron ore, is crushed and then pulverized, as by grinding to a fineness such that the valuable portion of the ore may be readily freed from the gangue, which is associated therewith. Depending upon the nature of the ore, the degree of pulverization is preferably at least such that it will pass a 60 to 100 mesh screen. If higher grade products are required, or the ore contains considerable gangue, or gangue difficult to remove, the ore must be ground still finer, such as up to 200 or even up to 400 mesh size. The gangue is then separated from the remainder of the ore in any suitable way, such as by magnetic separation for magnetite ore, jigging or flotation for hematite and other non-magnetic ores, or other method of beneficiation. If the raw ore is in the form of iron sands, they may be concentrated in these or other ways directly without the crushing step, although fine grinding to the required pulverulent state is necessary in most instances.

The carbon utilized for combination with iron oxides is as pure as is commercially obtainable so as to leave no substantial or deleterious quantities of ash or other residue in the reduced ore as the result of the reducing reaction. Thus, carbon black, pitch, or substantially ash-free charcoal or coal, or other forms of relatively pure carbon are employed. The carbon, whatever its source, should preferably be at least as finely ground, or finer, than the raw ore.

The pulverulent raw ore, or carbon, or ore-carbon mixture may have admixed therewith if desired, certain modifying agents, such as soda, fluorspar, or other fluxes for the purpose of combining with the remnant of impurities left in the powder to be squeezed out in the process of extruding, rolling, or forging, such fluxes having a substantially lower melting point than the metals and being substantially as finely divided as the ore powder, or finer; or silicon, sulphur, carbon or other elements desired in the finished steel may be added in powdered form to the raw ore powder; or manganese, titanium, nickel, chromium, or other metals or alloys of such metals with iron or with each other in the form of powder, preferably as fine as the ore powder, or finer, may be admixed with the raw ore powder for the production of alloy steels; or an excess of carbon alone may be added beyond that specified in the finished steel or for reduction, for the purpose of reducing to carbon monoxide the oxygen in the air entrained in the powder.

Referring to Fig. 1, numeral 10 designates a vibrating feeder comprising a hopper 11 containing the pulverulent carbon described, this hopper 11 discharging upon an elongated tray or pan 12 supported on spaced spring bars 13 anchored at their lower ends on a suitable base 14, which also rigidly supports an electrical vibrator 15 for vibrating the hopper 11 and the tray 12 at high frequency, the tray being vibrated in a generally lengthwise direction, i. e., in the general direction of travel desired for the material. The frequency of the vibration for the fine material here employed is on the order of 3000 to 7200 cycles per minute, or more or less, depending on the load and rate of feed required. Thus, by adjusting the unit number of vibrations imparted to the tray 12, the rate and volume of feed of the material along tray 12 may be regulated with great accuracy. The particular type of vibrator feeding impulse mechanism shown herein forms no part of the present invention, but is a commercial vibratory feeder, further details of which may be obtained upon reference to Patent No. 2,094,787, issued October 5, 1937, to J. G. Flint. Equivalent vibrating feeding mechanism may be used with equal facility.

The same type of vibrating feeding mechanism is utilized to supply the pulverulent raw ore from hopper 16 and its pan 17 in the regulated quantity proportional to the carbon supplied by apparatus 10, the ore-carbon ratio being such that the iron oxides of the ore are completely reduced, and this ratio depends upon the character of the oxides. Preferably a slight excess of carbon is supplied to reduce to carbon monoxide the oxygen in the air included in the raw ore mass. As described, carbon in addition to that required for the reduction of the ore, or additional to that supplied for eliminating the included air, may be added for modifying the finished product. Also, the aforementioned other modifying agents, fluxes, or the like, may be admixed in proper quantities with the ore powder before supplying it to hopper 16, or with the carbon before supplying it to hopper 11, or a third vibrating feeder like 10 may be used for that purpose.

The measured streams of raw ore and carbon powders are fed by their respective feeders to a common chute 18 which discharges into a motor-driven mixer 19 of conventional type, wherein the carbon and raw ore are intimately mixed, as well as the fluxes or modifying agents, if added.

The mixer 19 discharges the ore-carbon mixture through spout 23 directly into the reducing chamber or retort 20, which, as is shown particularly in Fig. 2 is preferably a channel-shaped trough 21 provided with a cover 22, both of electrical non-conducting material to confine the induced heating currents to the conducting charge. Chamber 20 is tightly closed, save for necessary inlets and outlets and they are likewise sealed. For example, the space between spout 23 and the enlarged hole in the cover through which it passes is sealed by a flexible collar 24.

The reducing chamber 20 is likewise supported by flexible bars 25 on base 26 and is vibrated by an electric vibrator 27, like vibrator 15 previously described, so that the chamber 20 acts as a conveyor of the powdered material, in the manner described in said patent.

Aligned with reducing chamber 20 and preferably constituting a continuation or extension thereof is a heating chamber 28 preferably constructed the same as reducing chamber 20 and similarly mounted by flexible bars 29 on base 26 for vibration as a conveyor by electric vibrator 30, which is like vibrators 15 and 27 and which may be synchronized with vibrator 27 or operate so as to advance the material through heating chamber 28 at a faster or slower rate than it is advanced through reducing chamber 20, according to requirements. It will be understood that only one heating chamber serving as both the reducing and further heating chambers may be employed, or that more than two sections like 20 and 28 may be employed, each advancing the material at a different rate. In the case where two or more sections are used, as shown, the connection between these sections must be such as to accommodate the differential vibration described without leakage at the joint, and to that end the section 20 is telescoped into section 28 and the joint between them sealed gas-tightly by a flexible collar 31.

The ore-carbon charge in reducing chamber 20 is heated to the proper temperature to effect reduction of the ore, and this heating may be effected by any suitable means, such as by heating chamber externally as by fuel burners or electric resistance heaters arranged along the bottom of chamber 20, by enclosing chamber 20 in a furnace, or by supplying the heat in the chamber, as by burning fuel therein, electric resistance heaters arranged in the chamber, or by passing non-oxidizing heating gas through the chamber 20, or the like. Preferably, however, the charge is heated by electric induction, as in an electric induction furnace, and the chamber 20 is accordingly wound with the coil 32 supplied from a suitable source of high-frequency power, as will be readily understood. The coil 32 may be wound directly on the reducing chamber 20 and covered by a combination electrical and heat-insulating outer layer 33, as shown particularly in Fig. 2. A single coil 32 may extend along the entire reducing chamber 20, as shown, or may be sectional, each succeeding section from left to right, as seen in Fig. 1, providing a progressively increasing temperature, if desired.

The heating chamber 28 is similarly wound with one or more coils, such as coils 34 and 35 shown, each having a separate energizing circuit. The charge is thus heated in heating chamber 28 to the consolidation temperature of the material, which is near the welding temperature, as will be described.

The vibratory heating chamber 28 discharges into a stationary hopper 36 mounted on base 26 and sealed to the end of chamber 28 by a flexible collar 36′ which accommodates the vibration between them. The hopper 36 discharges into an extrusion press 37 comprising the cylinder 38 containing the reciprocating plunger 39 driven by the hydraulic ram 40. The cylinder 38 communicates with a converging extrusion die 41 opposite the end of the plunger 39 which discharges on to a roll conveyor 42, as shown. Hopper 36 may be heated by a high-frequency coil, not shown, but similar to coils 32, 34, 35 so as to maintain the material hot in its course to the cylinder 38 of press 37, which may be likewise heated if required, although ordinarily neither hopper nor press need be specially heated.

The left-hand end of reducing chamber 20 is closed by plate 43 having a gas draw-off duct 44, containing the flexible joint 45 permitting relative vibration, duct 44 being connected to the intake of a rotary suction pump 46 or the like, for drawing off the spent gas counterflow to the movement of the charge, and also providing a vacuum in chamber 20 to promote ejection of spent reducing gases from the charge, as will be described.

In operation of the apparatus illustrated by Fig. 1, the pulverulent carbon from hopper 11 and the pulverulent raw ore from hopper 16, with or without admixture of the aforementioned fluxes, alloying metals or other modifying agents, are fed along their respective vibratory conveyor trays 12 and 17, as described in said patent, in regulated relative proportions. Carbon in excess of that required to reduce the oxides of the raw ore is preferably added by regulating the supply by conveyor 10, for the purpose of reducing to carbon monoxide the air included within the raw ore mass by reason of its original exposure to the air in hopper 16 and prior. Still further carbon may be added by conveyor 10 beyond that required for the reducing reaction or for the elimination of included air, in order to suit a specification for predetermined quantity of carbon in the finished steel. The functioning of vibratory conveyor 10 enables the carbon to be measured with great exactitude in proportion to the raw ore to be mixed therewith in and by mixer 19.

The mixer 19 mixes the raw ore and carbon intimately and discharges the same continuously through spout 23 into the vibratory reducing chamber-conveyor 20, which is vibrated at high-frequency on the order of 3000 to 7200 cycles per minute, or more or less, depending on load and desired rate of feed, so as to rapidly agitate and simultaneously gradually advance the raw ore-carbon powder mixture along the floor of the same with the continuous up and down and simultaneous forward progression characteristic of that method of vibration, which has been described as a sort of saw-tooth path hopping motion, and which is described in greater detail in said patent.

While being so advanced through the reducing chamber-conveyor 20, the heating of the raw ore-carbon powder to the reducing temperature is initiated by the heat generated internally therein by electric induction, due to the energization of the coil 32 from a suitable high-frequency power source, according to the well-known electric induction heating phenomenon practiced in electric induction furnaces, and the like, except that in this case the ore is not melted, remaining in finely-divided solid form.

With the exception of hematites which are exothermic, the reducing process essentially constitutes combustion of the carbon in the oxygen derived from the ore oxides and is endothermic. The ore-carbon mixture itself provides a certain amount of its own heat requirements, but the balance of the heat necessary for the reducing reaction must be supplied from another source.

The electric induction heating method described lends itself admirably for this purpose, since it can be accurately controlled. Also, this method enables the reaction to be carried on in a relatively small, sealed, well-insulated chamber, such as chamber 20 shown, so that the heat is conserved, thus providing great thermal efficiency.

Furthermore, the combustible reducing gas emanating from the ore-carbon mass as the result of the reaction between the carbon and ore oxides and between the added carbon and the air included in mass, this gas being largely carbon monoxide, may be burned within the reducing chamber 20 by carefully bleeding into it through pipes 48 a sufficient amount of pressure air from source 49 to combine with this gas. This provides additional heat in the retort to be added to the heat of the reaction and the electrically-induced heat to provide the total necessary to complete the reduction of the ore, but without melting the same. The amount of air added in this way must not be in excess of that required for the purpose, so that there will be no opportunity for reoxidation of the ore. The products of the combustion and reaction, mainly carbon dioxide, is drawn off from the cooler end of the chamber 20 through duct 44 by pump 46.

During this heating and reduction step the particles of ore are in constant motion due to the high-frequency vibration imparted thereto by the vibrator 27 in working the mass along the floor of the chamber 20, as described. This vibrating motion has the effect of continually loosening and moving the contacting particles relatively to each other with a rubbing or attrition action, which repeatedly breaks up the envelope of spent gases surrounding each particle, thus enabling fresh reagents to continually attack the unreduced particles or portions thereof. Consequently the reducing reaction is greatly accelerated, enabling the reducing time to be materially decreased from the many hours required when the ore-carbon is packed in a quiescent mass, to only a few minutes in the present process.

This high-frequency vibration of the particles in the mass also aids in ejecting the gaseous products of the reaction and the reduction of the included air in the mass, and if desired this gas ejection and further disturbance of the mass may be promoted by means of one or more stationary plows 43' which turn over the entire mass as it passes by them in its progression along the floor of the chamber 20. The chamber 20 may also be maintained under partial vacuum by means of pump 46, which also aids in the removal of the spent gases from the individual particles and the charge as a whole.

It will be understood that the reducing chamber 20 may be as long as required, commensurate with the rate of progression therein and the degree of heat application thereto. Preferably the heating is progressive, being provided by a series of separately energized coils, so that the reaction progresses gradually and results in more thorough and complete reduction than if the reaction were promoted suddenly in a short heat zone. Thus, by the time the material reaches the end of reducing chamber 20 it is not only completely reduced, but it is heated to a high temperature, although less than fusion, and can be directly discharged through chute 36 into the extrusion press 37, if desired.

However, the heating is preferably continued in the heating conveyor 28, which communicates with reduction chamber 20 as a continuation thereof, but is separately vibrated to advance the material at a different rate than it is passed through reducing chamber-conveyor 20, usually at a faster rate because the heating to the higher degree can be accomplished more rapidly. Because the reduction is slower than the further heating, two or more reducing chambers 20 may discharge the reduced ore powder into a single heating chamber like 28.

The continued and additional heating in chamber 28 is likewise preferably performed within the charge by electric induction by means of high-frequency energization of sectional windings 34 and 35 or more, so that by the time the material discharges through chute 36 it is heated to the temperature necessary to consolidate the particles, which is usually near the welding temperature but short of actual fusion to preclude sticking of the particles to the walls of the apparatus. Preferably, the plows 43' are also placed in heating chamber-conveyor 28, for the purpose of turning over the whole mass of reduced ore to loosen the same further, ensure uniform heating and aid in ejecting any adhering gases by exposing different parts of the mass, this gas burning in the air supplied by pipes 48 if combustible, or is withdrawn by the suction pump 46.

The hot reduced ore particles discharged by chute 36 into cylinder 38 of press 37 are forced by plunger 39 through converging extrusion die 41 to be compacted in all directions, laterally and longitudinally, into a dense homogeneous bloom or billet B, preferably of relatively large dimensions comparable to the blooms or billets fed to the metal working equipment used in the modern steel mill, such as rolls, hammers, forges, presses, extrusion or drawing dies, tube mills, ring or push benches, and the like. Before being fed to such finishing or semi-finishing equipment, the bloom or billet B may be reheated if required.

The billet B, when extruded as described, has transverse tensile strength equivalent to its longitudinal tensile strength, and has a very fine grain structure, modified as and if desired by the inclusion of the aforementioned elements, alloying metals, or the like. While the direct extrusion of the finely-divided reduced ore in the manner described is preferred, the reduced ore may be compacted into a self-contained billet, which is then heated to the welding temperature of the material and worked into a homogeneous metal body, as described in copending application Serial No. 316,717, filed February 1, 1940, of H. A. Brassert; or the reduced ore powder may be charged into containers of similar metal, the whole heated to the consolidation temperature and the container and its contents worked into a unitary body, as disclosed in copending application Serial No. 318,814, filed February 14, 1940 of H. A. Brassert.

Instead of premixing the raw ore and carbon as described in connection with the arrangement of Fig. 1, the high frequency vibratory motion imparted to the particles in the processing chamber may be used to intimately intermix the raw ore or carbon particles, due to their widely different specific gravities. An arrangement for effecting this direct mixture is illustrated in Fig. 3, wherein the pulverulent carbon and pulverulent raw ore is supplied in measured proportions from the respective hoppers 11' and 16' along respective vibrating trays 12' and 17' as in Fig. 1. However, instead of supplying the carbon and ore to a mixer, these ingredients are separately fed by their respective trays 12' and 17' to corresponding chutes 52 and 53, which discharge separately into the vibrating reducing chamber-conveyor 20'.

The chutes 52 and 53 are positioned as shown in Fig. 3, so that the carbon powder is deposited as bottom layer 54 directly on the floor of the chamber 20' and the ore powder is deposited as a layer 55 overlying the carbon layer 54. The joints between the chutes 52 and 53 are sealed by corresponding vibration-accommodating flexible collars 56 and 57, respectively, and the chamber 20' is vibrated at high-frequency by the vibrator 27' while its contents are simultaneously heated to the reducing temperature, preferably by electric induction, as before.

Due to the high-frequency vibration imparted to the reducing chamber-conveyor 20' the characteristic upward and forward impulses continuously given to the particles cause the lighter carbon particles in layer 54 to gradually migrate upwardly through the heavier ore particles in layer 55, thus bringing individual carbon particles into contact with unreduced ore particles all the way up through the original ore layer 55, the ore particles meanwhile migrating downwardly in a similar fashion due to their greater weight as compared to the carbon particles. This condition of mixture is indicated graphically at 58 in Fig. 3.

It will be understood that during this relative migrating movement between the carbon and ore particles, the ore is reduced in the manner previously described, the rubbing of the particles together due to their vibrating motion resulting in rupture of the gaseous envelope around each ore particle so that fresh reagent may attack the unreduced portion of the ore particles. Any unconsumed carbon particles reaching the surface of the charge are burned in the air supplied by the pipes 48 shown in Fig. 1, and the air included in the charge is likewise used to burn excess carbon which may be added for that purpose, as previously mentioned.

Instead of supplying the ore and carbon separately as described, the ore powder and carbon powder in the theoretical proportions necessary to reduce the ore oxides may be premixed and supplied to hopper 16' in Fig. 3. The desired excess of carbon may be supplied from hopper 11' to be separately deposited on the floor of the reducing chamber-conveyor 20' as layer 54, while the ore-carbon mixture from hopper 16' may be deposited on the carbon layer 54 as layer 55. The excess carbon particles in layer 54 thus work up through the ore-carbon layer 55 due to the vibration as described, to combine with any included air in the layer 55 and to insure application of the reagent to all the ore particles during the reducing heat. Unconsumed carbon particles reaching the surface of the mass are burned in air bled into the chamber 20' by pipes 48, as aforementioned.

In either case, the ore is reduced without fusion in chamber 20' as the result of the heat applied to the ore-carbon mixture and while the mass progresses through the chamber as the result of the conveying vibration.

The aforementioned fluxes, elements, alloying metals, or other agents for modifying the chemical constituency of the finished product, such as steel, may be added either by prior admixture with the carbon or ore supplied to the hoppers 11' and/or 16', or a separate vibratory and measuring feeder like 10 in Fig. 1 may be used for supplying this agent.

A partial vacuum may be applied during reduction by pump 46 and the plows 43' may also be employed for turning over the mass as it progresses.

The reduced ore particles then pass through the same heating chamber 28 described in connection with Fig. 1 to be heated to the consolidating temperature for working into a billet or bloom B in the extrusion press 37, or other working device.

By heating the reduced material in the press 37 to the plastic state, such as by electric induction in the manner described, or other heating method, the material can be immediately worked into finished shapes, rails, and the like by providing the extrusion die 41 with the proper configuration, thus eliminating the first particle consolidation step and going directly to the metal shaping step. It will be understood that these steps in the process of this invention during which the reduced ore is susceptible to reoxidation, i. e., from and including the reducing chamber 20 or 20', through the heating chamber 28, chute 36 and press 37, are conducted under neutral atmospheric conditions to preclude the reoxidation. The gaseous products of the reactions maintain the non-oxidizing atmosphere within the closed system, the air added by pipes 48 being not sufficient to affect this condition since only sufficient air is admitted to promote combustion of the combustible gases with ignition thereof practically instantaneous.

From the foregoing description of typical embodiments of the invention, it will be apparent that this invention provides very simple and effective ways of rapidly and continuously and directly converting pulverulent raw ore into solid, dense and homogeneous bodies easily converted into semi-finished or finished metal products, such as shapes, rails, tubes, sheets, and the like, and that while the process is particularly applicable to the treatment of iron and steel, it is also possible to treat other ferrous or non-ferrous metals or alloys in a similar way. Therefore, the above-described examples of typical embodiments of the process should be considered as illustrative only and not as limiting the scope of the following claims.

I claim:

1. The process of making a metallic product, which comprises mixing pulverulent raw ore and pulverulent carbon, vibrating the mixture at high frequency while heating the same by electric induction to effect reduction of the raw ore without fusion, whereby the mixture is moved through the zone of heating and the rubbing between the particles caused by said vibration accelerates the reducing reaction by repeatedly rupturing the envelope of spent reducing gas surrounding the ore particles to admit fresh reagent thereto, effecting a constant movement of the gaseous products of the reduction out of the reaction zone in counterflow relation to the movement of said mixture therethrough and supplying oxygen sufficient only to burn the combustible constituents of said gaseous products of the reduction during said counterflow movement.

2. The process of making a metallic product, which comprises charging a mixture of pulverulent raw ore and pulverulent carbon into a closed retort, vibrating the mixture at high frequency while in said retort, heating the mixture while so vibrated to the reaction temperature to effect reduction of the raw ore, admitting a sufficient amount of oxygen to the retort to sustain combustion of the combustible products of the reaction, and discharging the reduced ore from the retort.

3. The process of making a metallic product, which comprises feeding a layer of pulverulent raw ore upon a layer of pulverulent reducing reagent, heating the ore and reagent to the reducing temperature but less than fusion and vibrating said layers of ore and reagent, while subjected to the reducing temperature, in such manner that the reagent particles gradually migrate upwardly through and in intimate contact with the ore particles, whereby reaction between unreduced ore and reagent is promoted at a rapid rate.

4. The process of making a metallic product, which comprises feeding a mixture of pulverulent raw ore and sufficient pulverulent reagent to reduce the ore impurities upon a layer of excess pulverulent reducing agent, heating the ore and reagent to the reducing temperature but less than fusion and vibrating said layers of ore and reagent, while subjected to the reducing temperature, in such manner that the reagent particles gradually migrate upwardly through and in intimate contact with the ore particles, whereby reaction between unreduced ore and reagent is promoted at a rapid rate.

5. The process of making a metallic product, which comprises charging a mixture of pulverulent raw ore and pulverulent carbon into a closed retort, vibrating the mixture at high frequency while in said retort in order to effect both agitation of said mixture and travel thereof through said retort, heating the mixture while so vibrated to the reaction temperature in order to effect reduction of the raw ore, admitting a sufficient amount of oxygen to the retort to sustain the combustion of the combustible products of the reaction, discharging the reduced ore from the retort and continuously withdrawing the gaseous products of the reduction and combustion in counterflow relation to the movement of the mixture through the retort.

6. The process of making a metallic product, which comprises feeding a layer of pulverulent raw ore upon a layer of pulverulent reducing agent, heating the ore and reagent to the reducing temperature but less than the fusion temperature, vibrating said layers of ore and reagent, while subjected to the reducing temperature, in such manner that the reagent particles migrate upwardly through and in intimate contact with the ore particles, effecting a constant movement of the gaseous products of the reduction out of the reaction zone and supplying oxygen sufficient only to burn the combustible constituents of said gaseous products of the reduction as they are being moved through said reaction zone.

HERMAN A. BRASSERT.